O. M. GRAVES.
REFRIGERATOR.
APPLICATION FILED AUG. 15, 1916.
1,223,964.
Patented Apr. 24, 1917.
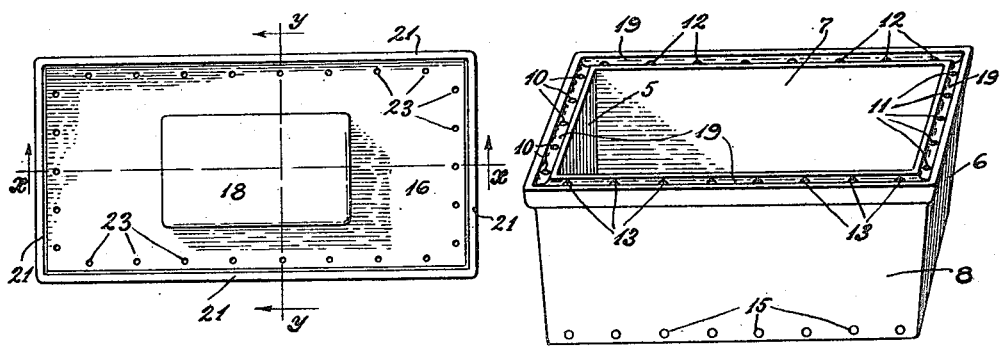
FIG. 1
FIG. 2
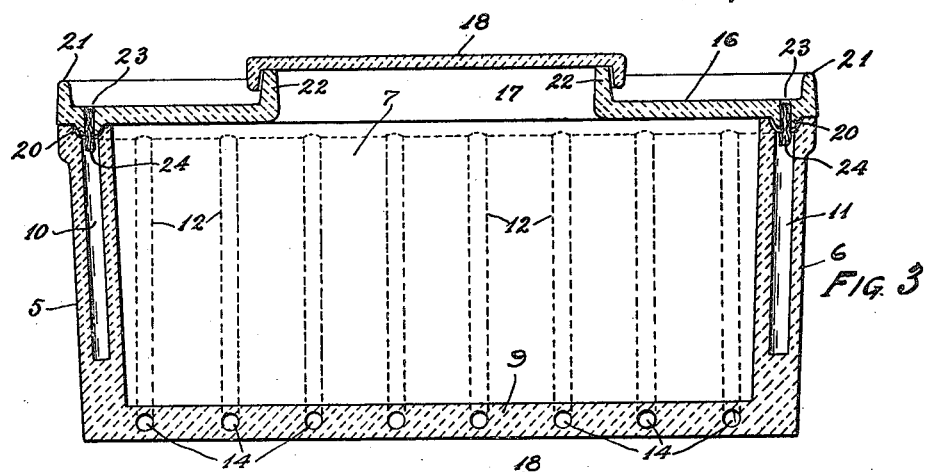
FIG. 3
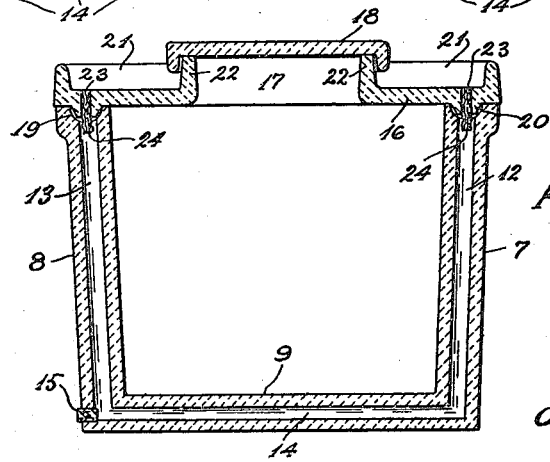
FIG. 4
WITNESS
OJohnson
INVENTOR
Oriel M. Graves
BY
C.D. Haskins
ATTORNEY

UNITED STATES PATENT OFFICE.

ORIEL M. GRAVES, OF EPHRATA, WASHINGTON.

REFRIGERATOR.

1,223,964. Specification of Letters Patent. Patented Apr. 24, 1917.

Application filed August 15, 1916. Serial No. 115,085.

*To all whom it may concern:*

Be it known that I, ORIEL M. GRAVES, citizen of the United States, residing at Ephrata, in the county of Grant and State of Washington, have invented a certain new and useful Improvement in Refrigerators, of which the following is a specification.

My invention relates to improvements in refrigerators, and the object of my invention is to provide a refrigerator made of such form and material as shall adapt it to serve as a storage receptacle for food and food products, and which, without the aid of ice, shall maintain its contents at a lower temperature than the temperature of the surrounding exterior atmosphere.

I accomplish this object by devices illustrated in the accompanying drawings wherein Figure 1 is a plan view of a refrigerator embodying one form of my invention; Fig. 2 is a perspective view of the same with its cover removed; Fig. 3 is an enlarged view in vertical mid-section on broken line *x*, *x* of Fig. 1, showing the same with its cover in its closed position; and Fig. 4 is a view of the same in vertical cross-section on broken line *y*, *y* of Fig. 1.

Referring to the drawings, throughout which like reference numerals designate like parts, an oblong box-like structure, having integral thick end walls 5 and 6, side walls 7 and 8 and a bottom wall 9, is made of molded porous earthy material through which water may percolate, the inner surfaces of all of said walls being glazed or coated with suitable paint or other material that is impervious to water.

The top surfaces of the end walls 5 and 6 and the top surfaces of the side walls 7 and 8 are each provided with a groove or gutter 19 that extends throughout its length.

Extending downwardly from said gutter 19 in each of the end walls 5 and 6 are a plurality of equi-distantly spaced holes, as holes 10 and holes 11, which holes 10 and 11 terminate at points higher than the plane of the inner surface of the bottom wall 9, as shown more clearly in Fig. 3; and extending downwardly from said gutter 19 in each of the side walls 7 and 8 are a plurality of equi-distantly spaced holes, as holes 12 and 13, as indicated in Fig. 2 by small circles in full lines and by dotted lines in Fig. 3, which holes 12 and 13 connect each with a hole (like holes 14) that extends from the outer side of the bottom of the side wall 8 through said side wall 8 and thence transversely through the bottom wall 9 into the side wall 7, as shown more clearly in Fig. 4.

Thus, the bottom ends of opposite ones of the holes 12 and 13 are connected together by one of the holes 14 and the entrance to each of the holes 14 from the outer side of the wall 8 is provided with a removable stopper 15, as shown more clearly in Fig. 4, so that upon removing said stoppers 15 the holes 12, 13 and 14 can readily be cleaned.

Preferably, the outer side surface of the bottom wall 9, like the inner surfaces of the walls 5, 6, 7 and 8, is glazed or provided with a coating of material, as paint, that is impervious to water.

Obviously, if water be supplied to the holes 10, 11, 12 and 13 such water will gradually percolate through the porous earthy material of the side walls 5, 6, 7 and 8 to the outer side surfaces of said side walls to evaporate therefrom, which evaporation, in accordance with well known physical laws, will act to reduce the temperature of said walls 5, 6, 7 and 8 which, in turn, will absorb and conduct heat from the interior of the receptacle to cool its contents.

Disposed to cover the open top of the receptacle is a removable cover 16 which is provided with an oblong opening 17 in its central portion, which opening 17 is provided with a removable auxiliary cover 18.

The underside of the cover 16, adjacent to the outer edges thereof, is provided with a ridge 20 which is adapted to register with and fit into the gutter 19, as shown more clearly in Figs. 3 and 4; and the upper side of said cover 16 is provided with an upwardly projecting flange 21 that extends throughout the length of its edge portions.

The upper side of said cover 16 is also provided with a flange 22 that extends upwardly from the edges of all sides of the opening 17, upon which flange 22 the auxiliary cover 18 is removably disposed.

Extending downwardly through said cover 16 and through the downwardly projected ridge 20 are a plurality of holes, as holes 23, which correspond to and are disposed to register with respective ones of the holes 10, 11, 12 and 13; and each of said holes 23 is provided with a filling 24 of porous or absorbent material, as, for instance, fiber like a lamp wick.

When constructed as illustrated and described, the operation of my invention is as follows:

After articles have been disposed within the receptacle, the covers 16 and 18 are disposed in their positions to cover the receptacle and thereupon water is poured on to the top of the cover 16 to fill the space throughout the area between the flanges 21 and 22, which space may serve as a shallow reservoir for water, whereupon such water will percolate through the fibrous fillings in the holes 23 to drop into respective ones of the holes 10, 11, 12 and 13, there to be absorbed by the porous walls, 5, 6, 7 and 8 until such walls are thoroughly saturated whereupon such water will reach the outside surfaces of said walls 5, 6, 7 and 8, there to be evaporated into the surrounding atmosphere with the obvious result that the walls 5, 6, 7 and 8 and the interior of the receptacle will be cooled and be maintained cool so long as water is present in the shallow reservoir on the top of the cover 16.

In that form of my invention which is illustrated by the drawings, I have shown the holes 23 in the cover as registering with respective ones of the holes 10, 11, 12 and 13 and have shown such holes 23 as being provided with a filling 24 of porous or absorbent material, but such holes may be reduced in number and disposed not to register with any of the holes 10, 11, 12 and 13 and the filling, like the filling 24, may be dispensed with, in which case such holes would merely serve as a funnel for conducting water from the top of the cover into the gutter 19 which water could then find its way into the holes 10, 11, 12 and 13.

Of course, it is only required that the holes 10, 11, 12, and 13 be supplied with water from time to time in order to saturate the porous walls of the structure.

Also in some cases, if desired, the holes 14 in the bottom wall of the structure may be dispensed with although they facilitate the operation of cleaning the holes 12 and 13 connected therewith.

Obviously, instead of glazing or painting the inner side surfaces of the walls 5, 6, 7 and 8 and the bottom wall 9, such surfaces may be lined with sheet metal plates joined to be water tight; and the glazing or paint on the underside surface of the bottom wall 9 may be advantageously omitted if the receptacle be disposed on a rack-like support whereby such surface may be exposed to the surrounding atmosphere.

Manifestly, the number, forms and dimensions of the holes or recesses within the porous walls of the receptacle may be changed and the receptacle may be formed to have circular walls instead of rectangular walls without departing from the spirit of my invention.

What I claim is:

1. A refrigerator of the class described, which embodies a box-like receptacle formed of molded porous earthy material and having a gutter-like groove in the top surface of its vertical walls; a plurality of holes disposed to extend downwardly from said gutter-like groove into said vertical walls to form cells for water; a cover removably disposed to cover said receptacle, said cover being provided with a ridge extending along the edge portions of its bottom side to adapt said ridge to project into said gutter-like groove; an opening formed in the central portion of said cover to give access to the interior of said receptacle; flanges projecting upwardly from the top of said cover and disposed one to extend around the outer edges thereof and the other to extend around the edges of said opening, whereby there is formed a shallow reservoir for water on the top of said cover; and a plurality of holes extending downwardly through said cover and through said ridge and disposed to register with respective ones of said cells, said holes being provided with a filling of material through which water may percolate whereby water from said shallow reservoir may find its way into said cells to saturate the porous walls of the receptacle.

2. A refrigerator of the class described, which embodies a box-like receptacle formed of molded porous earthy material whereby its end walls, side walls and bottom wall are integral and porous, the inner side surfaces of all of said walls being covered with material that is impervious to water; a gutter-like groove formed in the top surfaces of said end walls and side walls to extend throughout the lengths thereof; a plurality of holes disposed to extend downwardly from said gutter-like groove into said end walls to form cells for water; a plurality of holes disposed to extend from the outer surface of the lower portion of one of said side walls transversely through said bottom wall and into the opposite side wall, the entrance of each of said holes being closed by a removable stopper; a plurality of other holes disposed to extend downwardly from said gutter-like groove in each of said side walls to communicate with respective ones of the holes that extend transversely through said bottom wall; a cover removably disposed to cover said receptacle, said cover being provided with a ridge extending along the edge portions of its bottom side to adapt said ridge to project into said gutter-like groove; a container for water integrally associated with the top side of said cover; and conduit means extending between said container and the holes which extend downwardly from said gutter-like groove into said end walls and side walls, said conduit means containing material which permits water slowly to percolate therethrough.

In witness whereof, I hereunto subscribe my name this 9th day of August, A. D. 1916.

ORIEL M. GRAVES.

Witnesses:
DWIGHT T. HETER,
AGNES C. GROMISH.

Copies of this patent may be obtained for five cents each, by addressing the "Commissioner of Patents, Washington, D. C."